United States Patent [19]

Panetti

[11] E Patent Number: Re. 32,979

[45] Reissued Date of Patent: Jul. 11, 1989

[54] DEVICE FOR THE IN SITU REPROFILING OF THE HEAD OF AT LEAST ONE RAIL OF A RAILROAD TRACK

[75] Inventor: Romolo Panetti, Geneva, Switzerland

[73] Assignee: Speno International S.A., Geneva, Switzerland

[21] Appl. No.: 89,012

[22] Filed: Aug. 21, 1987

Related U.S. Patent Documents

Reissue of:

[64] Patent No.: 4,615,150
Issued: Oct. 7, 1986
Appl. No.: 696,249
Filed: Jan. 29, 1985

[30] Foreign Application Priority Data

Feb. 1, 1984 [CH] Switzerland ..... 547/84

[51] Int. Cl.[4] ..... B24B 23/00; B24B 27/08

[52] U.S. Cl. ..... 51/178; 51/166 T; 51/166 MH; 51/5 B

[58] Field of Search ..... 51/178, 166 T, 166 MH, 51/166 TS, 5 R, 5 B, 165.9

[56] References Cited

U.S. PATENT DOCUMENTS

| | | | |
|---|---|---|---|
| 1,412,715 | 4/1922 | Siefertson | 51/166 T |
| 2,183,055 | 12/1939 | Vanderpool | 51/166 T |
| 2,636,323 | 4/1953 | Skreberg | 51/166 T |
| 2,748,540 | 6/1956 | St. George | 51/166 T X |
| 3,883,323 | 5/1975 | Cooley | 51/178 |
| 3,918,215 | 11/1975 | Scheuchzer | 51/178 |
| 4,309,846 | 1/1982 | Theurer et al. | 51/178 |
| 4,365,918 | 12/1982 | Theurer | 51/178 |
| 4,473,971 | 10/1984 | Mischler et al. | 51/165.9 X |

FOREIGN PATENT DOCUMENTS

| | | | |
|---|---|---|---|
| 2612174 | 6/1977 | Fed. Rep. of Germany . | |
| 862129 | of 1941 | France | 51/166 T |
| 626673 | 11/1981 | Switzerland . | |
| 22457 | of 1913 | United Kingdom | 51/166 T |

*Primary Examiner*—Robert P. Olszewski
*Attorney, Agent, or Firm*—Young & Thompson

[57] ABSTRACT

A rail grinding device comprising at least one reprofiling unit (80,81) driven along the track by a railroad vehicle (83); a jack (85) to displace in height the reprofiling unit with respect to the railroad vehicle (83) and to apply at least one tool of the reprofiling unit against the rail. The reprofiling unit (80,81) comprises at least one support (81) angularly displaceable with respect to the railroad vehicle (83) carrying several reprofiling tools (94,95) forming a group of tools. A positioning device (102), (104) and locking device (106,107) fixes the positions of the support (81) for which one (95) of the reprofiling tools (95,96) of the group of tools is located in working position.

16 Claims, 7 Drawing Sheets

FIG. 6
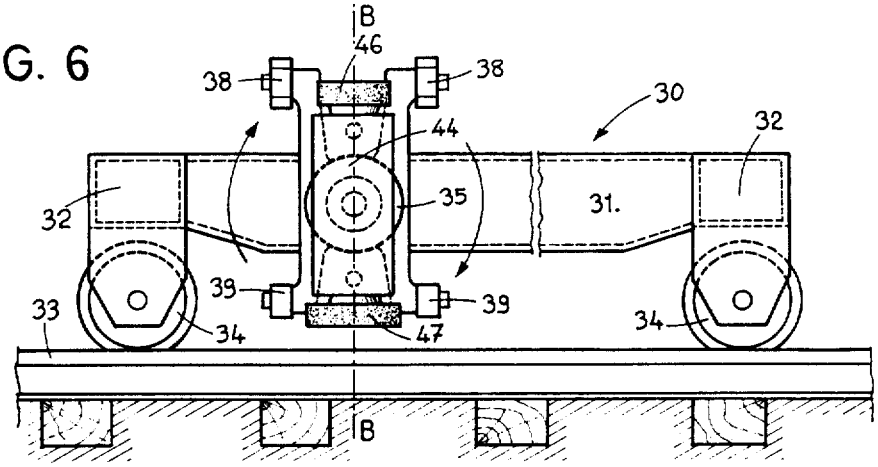
FIG. 7
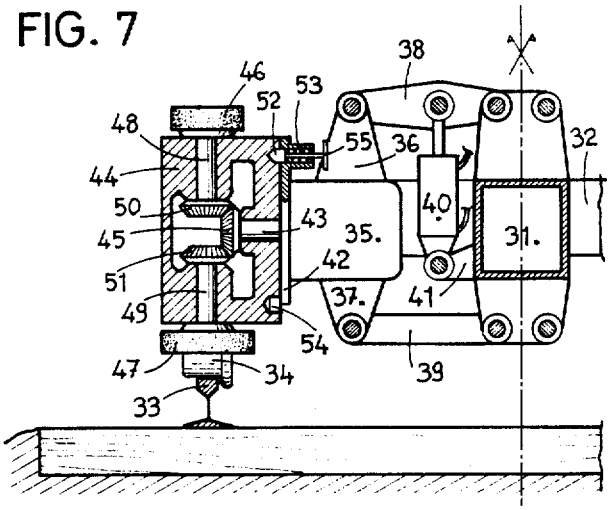
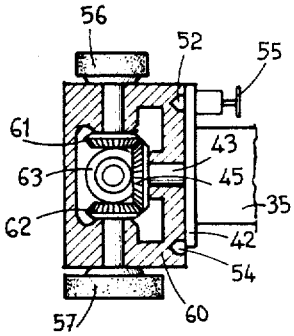
FIG. 9
FIG. 8
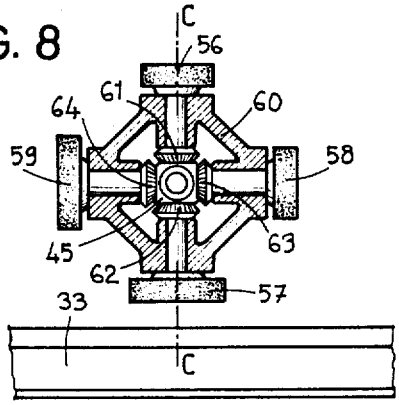
FIG. 10
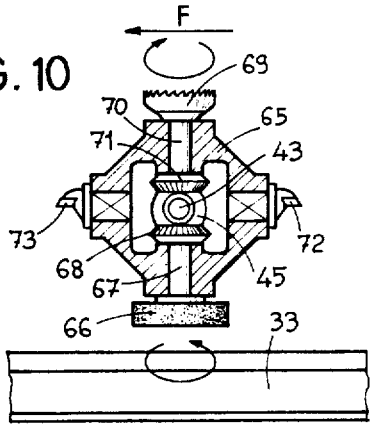

DEVICE FOR THE IN SITU REPROFILING OF THE HEAD OF AT LEAST ONE RAIL OF A RAILROAD TRACK

Matter enclosed in heavy brackets [ ] appears in the original patent but forms no part of this reissue specification; matter printed in italics indicates the additions made by reissue.

The present invention has for its object a device for reprofiling and/or rectifying in situ the surface of the head of at least one rail of a railroad track.

Under the effect of heavy loads and above all of the dynamic overloads, an undulatory wearing off is formed progressively on the surface of the head of the rail as well as an important alteration of the profile of this head, burrs of more or less importance can be formed.

To permit longer use of the rails one proceeds to a reprofiling of the rails particularly to their rectification, an operation which has the aim of giving to the rail desired transverse and longitudinal profiles.

The reprofiling and the rectification of the rails of a railroad track need frequent changes of the working tools whatever their nature. The tools having the form of milling cutters, or of scrapers, knives, cutters are submitted to forces and wear which are very high. They break frequently. The tools having the shape of abrasive blocks are applied to the rails with very high pressure, they are also subjected to forces which can cause them to break. On the other hand they deform by adapting themselves rapidly to the profile of the surface to be reprofiled to the detriment of the desired profile.

Finally the rotative grinding wheels are often driven in an intensive manner due to the power needed to make them rotate and due to their high contact pressure in order to obtain a maximum efficiency. On the other hand they wear very rapidly. Therefore in all these cases, there is a necessity of relatively frequently changing the reprofiling tools.

It is further to be noted the necessity of replacing during the work one tool having a given shape by another tool having another particular shape or of another type as a function of the nature of the work to be effected.

This is particularly the case with the tools having a cutter shape, knife shape or with the milling cutters which cannot work simultaneously the whole profile of the head of the rail and which it is necessary to replace by knives or milling cutters provided with a different cutting edge.

These same tools can permit only a coarse work of reprofiling and have to be replaced by tools of another type, abrasive blocks or rotative grinding wheels for the finishing work.

For the rotative grinding wheels there is an interest to be able to use wheels having a relatively high hardness for which the wear is relatively slow. But they perform only coarse work and it is desirable to replace them by smoother grinding wheels for the finishing work. These rotative grinding wheels are of a diameter such that they can hardly be used to work in the track switches or the level crossings. It is then necessary to replace them by wheels of a small diameter or by peripheral grinding wheels.

For all these reasons, it is necessary to frequently change the working tools. But such changes are practically impossible on track, even if it were authorized disregarding the security prescriptions. The different rapid fixing systems of the reprofiling tools which have already been proposed do not ameliorate this situation and it is frequently decided to forego a finishing work which would however desirable would interrupt the work without using totally the intervals which are already too short occurring between the train arrivals to come back to a station to change the reprofiling tools or finally to change prematurely the reprofiling tools presenting a certain wear in order not to be obliged to interrupt the work during the intervals.

The present invention has the aim to remedy these drawbacks. It permits replacing rapidly or even automatically a reprofiling tool by another one which is identical or has another shape or is of a different type. It permits always using the tool which is the best adapted to the work to be done, this to the profit to the quality of the work. It permits using it without loss of time and at the best time moment, thereby exploiting at the best the available intervals with improvement in the efficiency.

The attached drawings show schematically and by way of examples several embodiments and variants of a reprofiling device of the head of at least one rail of a railroad track according to the invention.

FIG. 6 shows in elevation from the side a second embodiment of the reprofiling device mounted on a carriage to be connected to a railroad vehicle.

FIG. 7 is a partial crosssection along line B—B of FIG. 6.

FIG. 8 shows in partial crosssection, perpendicular to the driving shaft, a variant having four reprofiling tools of the same type.

FIG. 9 is a partial crosssection of the variant shown in FIG. 8 along line C—C of this Figure.

FIG. 10 shows a partial crosssection of another variant of the reprofiling device comprising four tools of different types.

Figure 1:
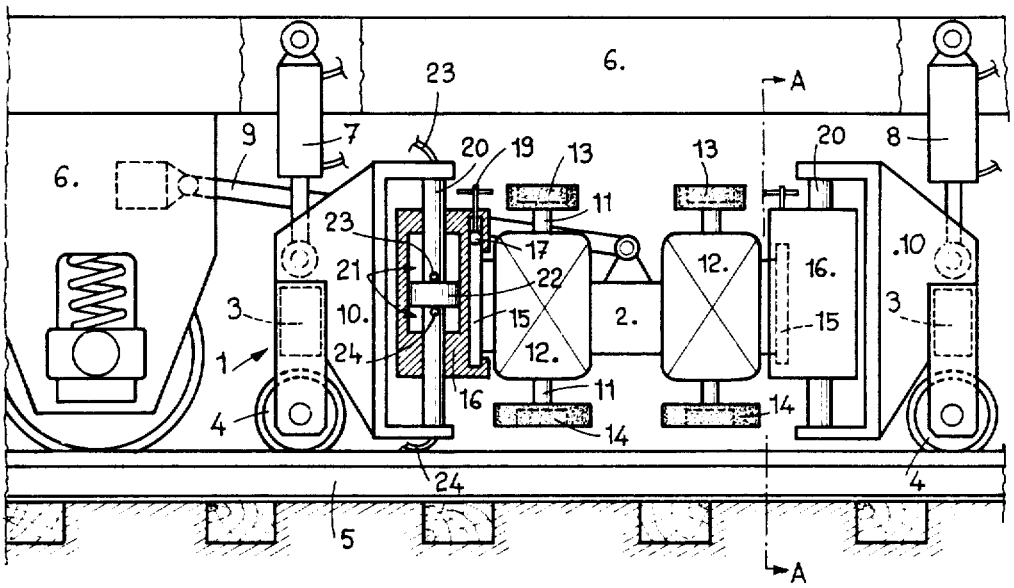
FIG. 1 is a side elevation of a first embodiment of the reprofiling device mounted on a carriage connected to a railway vehicle.
Figure 2:
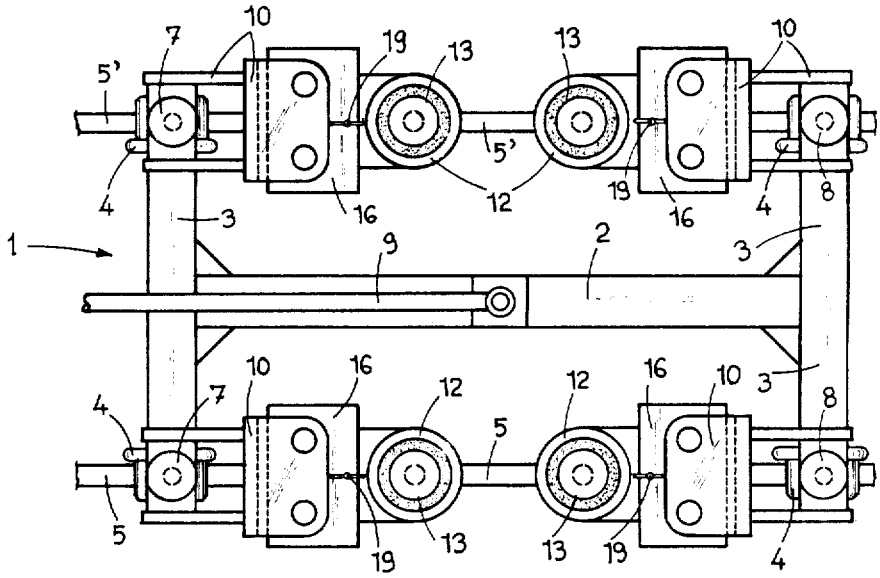
FIG. 2 is a top view of the reprofiling device of the carriage shown in FIG. 1.

To be able to obviate the draw-backs cited in the introduction and to realize the objects of this invention, the reprofiling device according to the present invention comprises at least one reprofiling unit driven along the track by a railroad vehicle. Means are provided to displace this reprofiling unit in height with respect to the vehicle as well to apply at least one tool of the unit against the rail with a determined pressure or against abutment members which can be fixed or adjustable.

Each reprofiling unit comprises an angularly displaceable support comprising a plurality of reprofiling tools, forming a group of tools, the working faces or edges of which are located in different planes. Through an angular displacement of the support with respect to the railway vehicle, each tool of the same group of tools can be brought into its working position, enabling it to enter in contact with the rail to reprofile it, the other tools of the same group being then in waiting position, wherein they cannot cooperate with the rail. Finally, the reprofiling device according to the invention comprises a positionning device permitting positioning the support in such a manner as to bring into working position the desired tool, as well as a locking device permitting fixing the support in the desired position.

Thus, each reprofiling unit comprises several tools forming one group and which can be brought through an angular displacement of the support successively into working position, the displacement of the support can be motorised, and above all there is no need to stop and change the tool. The tools of the same group can all be similar if it is needed to perform the same work for a long period of time. These tools can also be different, each adapted to a specific work operation. Therefore in a same group of tools one can have radial grinding wheels of different diameters, different granulometry and different hardness, radial grinding wheels and peripheral grinding wheels, scrapers or abrasive blocks, as desired.

By angularly displacing the support of the group of tools of one reprofiling unit of one or several steps, one replaces one tool by another, achieving the objects of the invention.

The first embodiment of the reprofiling device shown in FIGS. 1 to 5 comprise a guiding carriage 1, formed by a beam 2 and crossbeams 3, presenting flanged wheels 4 rolling on the rails 5, 5' of a railroad track. This guiding carriage 1 is connected to a railroad vehicle 6 on the one hand by jacks 7, 8 to enable its lifting for the running at high speed and on the other hand by a rod 9 for its driving along the track.

In the example shown, this carriage 1 has frames 10 carried by each of the ends of the crossbeams 3, that is a total of four frames on each of which is mounted one reprofiling unit through the intermediary of means which permit applying one tool of the unit against the rail with a determined force.

Each reprofiling unit comprises an electric motor the two ends of the motor shaft 11 of which emerge from its housing 12 and are adapted to receive the reprofiling tools, here grinding wheels. In the example shown one of the radial grinding wheels 13 has a smaller diameter than the other 14 to enable the reprofiling of the track switches and of the level crossing, the grinding wheel 14 being used for the reprofiling of the surface of the head of the rail 5. In this embodiment, the housing 12 of the motor constitutes a support which is angularly displaceable and which carries a group of two tools 13, 14. This support provided by the housing 12 of the driving motor of the grinding wheel 13, 14 in rotation comprises a flange 15 having a disc shape located in a plane parallel to the shaft 11 of the motor, rotatable in a body 16 mounted on the frame 10.

Figure 5:
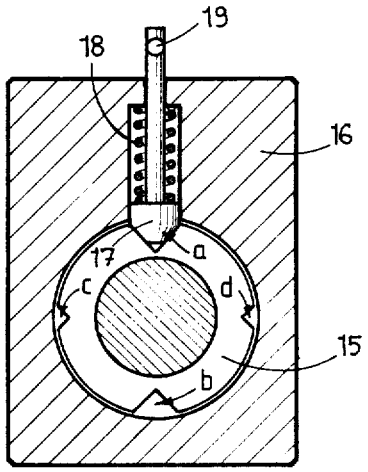
FIG. 5 shows on a greater scale a locking device of the angular position of the reprofiling units shown in FIGS. 1 to 4.

As seen in FIG. 5, the flange 15 comprises on its periphery four notches, a,b,c,d cooperating successively with a locking finger 17 subjected to the action of a spring 18 and which can be actuated manually by means of a control member 19.

The body 16 is slidably mounted on two columns 20 fast with the frame 10. The body 16 comprises chambers 21 surrounding the columns 20 which comprise a portion of greater diameter constituting a piston 22. Ducts 23, 24 provided in the columns 20 permit feeding a fluid under pressure into the chambers 21 either on the one side, or the other side of the piston 22 to cause a displacement of the body 16 along these columns. This system permits applying one of the tools 13, 14 of the reprofiling unit against the rail with a determined force.

Figure 3:
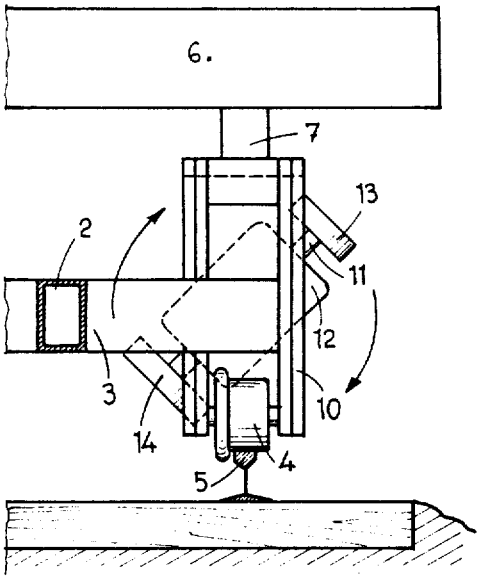
FIG. 3 is a partial front elevation of the device shown in FIG. 1.
Figure 4:
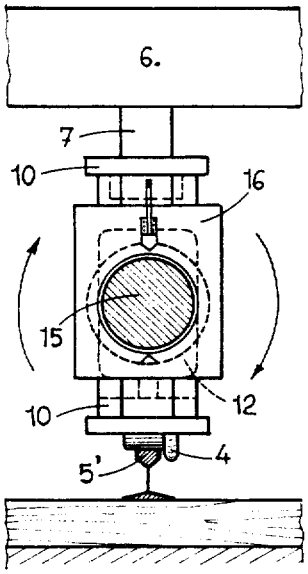
FIG. 4 is a partial crosssection along line A—A of FIG. 1.

Thus, with such a reprofiling device when the conditions necessitate the replacement of the tool 14 by the tool 13, one proceeds to the following operations.

a. one lifts the reprofilng unit by means of the jacks constituted by the chambers 21 of the body 16 and the piston 22 and the columns 20 of the frame 10 so that the tool 14 is no longer in contact with the rail.
b. one unlocks by means of the control member 19 the flange 15.
c. one pivots the support, here constituted by the flange 15 and the housing 12 of the motor, about 180°, FIG. 3 shows the motor and the grinding wheels during their pivoting.
d. one locks the support in this new position by means of the locking finger 17 entering into the notch b of the flange 15.
e. one applies the grinding wheel 13 against the rail with a desired force by means of the jacks constituted by the chambers 21 and the columns 20, 22.

It is evident that in variants, the pivoting of the support 12, 15 and thus of the motor and of the grinding wheels around an axis which is parallel to the longitudinal axis of the rail 5, can be motorised and controlled from the inside of the railroad vehicle as well as the locking and unlocking of the angular position of the support. Thus, the replacement of the working tool is performed rapidly and completely from without the inside of the driving vehicle.

When the railroad vehicle is in a station at rest, it is possible to fix the support 12, 15 in intermediate angular positions thanks to the notches c,d of the flange 15.

In these intermediate positions, the axes of the grinding wheel 13 and 14 are located horizontally in a position which is easily accessible facilitating their replacement.

In a variant of this embodiment, the motors 12 associated with a same rail 5 or 5' could be rigidly connected to each other, the two motors forming then only one support and only one reprofiling unit comprising two groups of two tools. This solution has the advantage of not having tool groups supported in cantilever relation.

The second embodiment of the reprofiling device is shown in FIGS. 6 and 7. Here also the reprofiling unit is carried by a carriage 30, formed by a beam 31 and crossbeams 32, rolling on the rails 33 of the track by means of flanged wheels 34. As in the first embodiment described, and without this being again represented in this figure, this carriage 30 is connected to a railroad vehicle to be driven by it along the track as well as by means permitting a displacement in height of this carriage with respect to the vehicle to put out of service the reprofiling device during the displacement at high speed of the railway vehicle.

Here the reprofiling unit comprises also a motor 35 the housing of which has two lugs 36, 37 each connected to the beam 31 through a hinged lever 38,39 forming thus a deformable parallelogram. A jack 40 is located between a lug 41 fast with the beam 31 and an intermediate point of the lever 38 and enables thus causing displacements in height parallel to itself of the motor 35, which is needed, as will be seen, to apply the tool against the rail with a determined force or to lift it off the rail.

The housing of this motor 35 has a flange 42 on the side where the motor shaft 43 emerges. This motor shaft 43 is rotatable in the wall of the housing 44, the flat face of which is applied against the free face of the flange 42, and terminates in a conical pinion 45.

The angular position of the housing 44 with respect to the motor is fixed by means of a locking finger 52, subjected to the action of its spring 53 cooperating with blind holes 54 in the housing 44. A control member 55 permits retracting the locking finger to modify the angular position of the housing 44 with respect to the motor. In this embodiment the housing 44 constitutes the angularly displaceable support on which the group of reprofiling tools is mounted.

Here also the group of reprofiling tools comprises two radial grinding wheels of different diameters 46, 47 carried by the shafts 48, 49 pivoted in the housing 44. The shafts 48, 49 and the motor shaft 43 are coplanar. Each of the shafts 48 and 49 comprises a conical pinion 50, 51 meshing with the conical pinion 45 of the motor shaft 43 for driving in rotation the grinding wheels 46, 47.

In this embodiment also only one of the tools of a group of reprofiling tools is in working position at a given moment and the movement of one tool from its waiting position to its working position is effected by a rotation of the housing 44 around the motor shaft 43. Intermediate positions of the support 44 may also be provided for the replacement of a grinding wheel. In this intermediate position the axis of a tool is then located approximately horizontally and in an accessible and handy position for its replacement.

This embodiment has the advantage that the motor 35 driving in rotation one group of grinding wheels 46, 47 undergoes only, with respect to the carriage 30, translation displacements of low amplitude facilitating its electrical connection. Another advantage resides in the fact that the gears 45, 50, 51 may constitute if desired a reducer, the speed of rotation of the grinding wheels 46, 47 being then different from that of the driving shaft 43, or even different from each other.

In this embodiment also one can motorise the locking and unlocking of the angular position of the housing 44 as well as its driving in rotation around the motor shaft 43. Another advantage of this embodiment resides in the fact that the support is lighter and thus easier to drive in rotation.

FIGS. 8 and 9 show a variant of this embodiment in which the group of reprofiling tools comprises four griding wheels 56, 57, 58, 59, each carried by a shaft rotatable in one wall of a housing 60 and meshing through pinions 61, 62, 63, 64 with the pinion 45 of the driving shaft 43. The same locking system 52, 53, 54, 55 is used to fix the respective positions of the housing 60.

In such an embodiment, one can have two radial grinding wheels of 57, 59 greater diameter, for the reprofiling of the head of the rail, having different granulometries or hardnesses, the harder one being used for the coarse work and the less hard for the finishing. The same can apply to the radial grinding wheels 56, 58 of smaller diameter which are used for rectifying the track switches.

In the variant shown in FIG. 10 the housing 65 constituting the angularly displaceable support around the motor shaft 43 carries two rotative tools, one grinding wheel 66 driven in rotation by a shaft 67 and a pinion 68 meshing with the motor pinion 45; and a milling cutter 69 driven in rotation through a shaft 70 and a pinion 71 meshing also with the motor pinion 45. This housing carries further two fixed tools such as the scrapers 72, 73 or abrasive blocks. In this variant, one of the static tools 72 is adapted to be in contact with the rail 33 during a displacement of this housing 65 with respect to the rail in the direction of the arrow F whereas the other static tool 73 is adapted for a relative displacement in a reverse direction.

It is to be seen therefore that the reprofiling tools of a same group can be very different from the others and each adapted to a particular work operation having to be performed on the rail.

It is evident that the number of reprofiling tools carried by a same support is not limited to four but could be higher. Thanks to gears or pinions driving the rotative tools, the reduction ratio between the shaft of each tool and the motor shaft can be adapted to the type of tools used so that each has an optimal rotational speed.

Furthermore, each of the driving shafts of the rotative tools can comprise a clutch or a claw coupling permitting to driving selectively one or more tools only.

Figure 11:
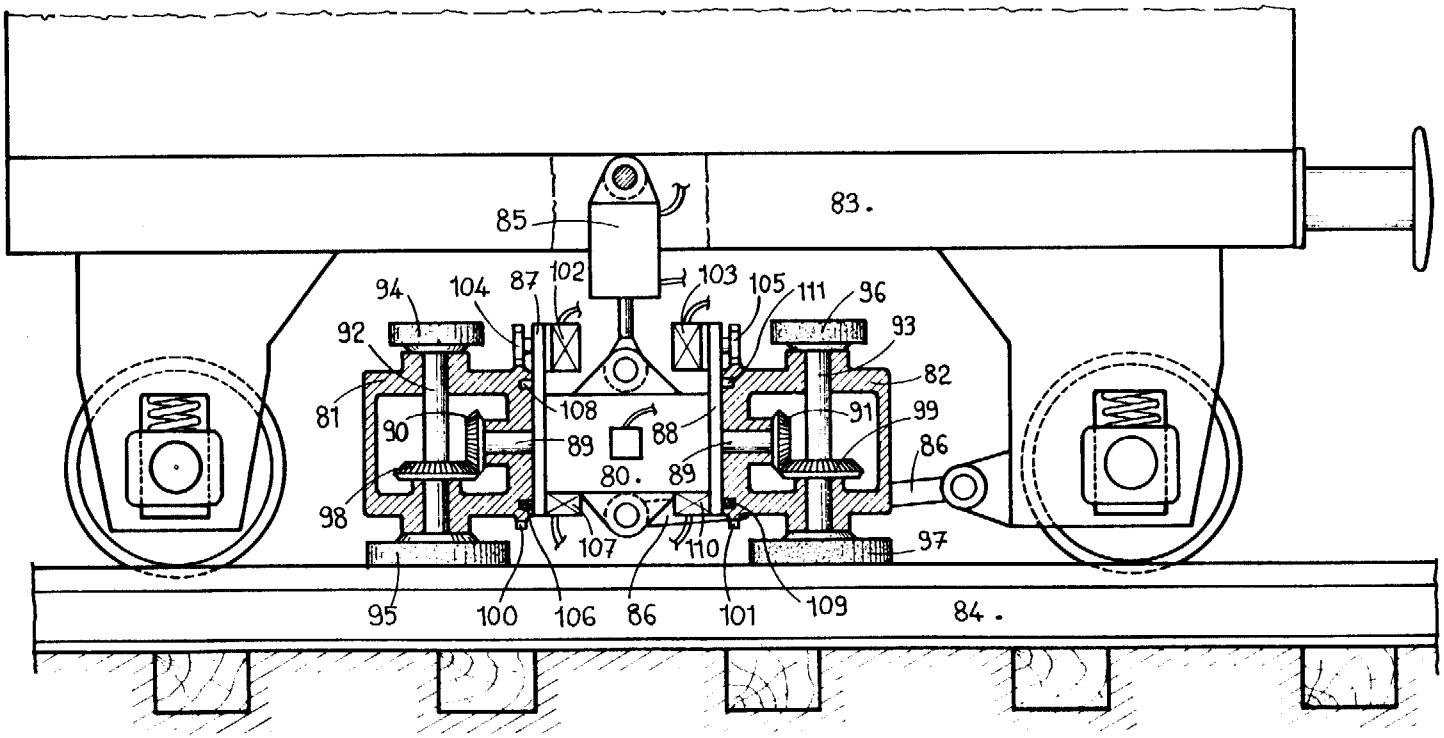
FIG. 11 is a side elevation of a third embodiment of the reprofiling device directly connected to a railroad vehicle.

In a third embodiment of the reprofiling device shown in FIG. 11, the reprofiling unit comprises a motor 80 and two angularly displaceable supports 81, 82 each carrying a group of reprofiling tools. This reprofiling unit is directly connected to a railroad vehicle 83 which ensures its guiding along the rail 84.

In this embodiment, the housing of the motor 80 is connected to the railroad vehicle 83 on the one hand by a jack 85 permitting lifting the reprofiling units and subsequently to applying a different tool of each group against the rail 84 with a determined force for the work. The housing of this motor 80 is on the other side connected to the railroad vehicle 83 through a lever 86 for traction along the track.

The motor 80 comprises flanges 87, 88 located at its ends, traversed by the motor shaft 89. The ends of this motor shaft 89 are rotatable in the wall of the housings 81, 82 and terminate in pinions 90 and 91.

Shafts 92, 93 perpendicular to the motor shaft 89 are pivoted in the housings 81 and 82 and carry at their ends merging out from the said housings two radial grinding wheels 94, 95 and 96, 97 of different diameters. Each shaft 92, 93 carries a conical pinion 98, 99 meshing with motor pinions 90, 91 respectively.

As in the preceeding embodiment, each support 81, 82 is angularly displaceable with respect to the motor 80 and thus with respect to the railroad vehicle 83 around the motor shaft 89, a plane force of each housing 81, 82 being applied agains the flange 87, 88 of the said motor 80.

In this embodiment each housing 81, 82 comprises a 100, 101 located in a plane parallel to the flange 87, 88. A motor 102, 103 fixed on the flange 87, 88 drives a pinion 104, 105 meshing with the gear 100, 101 for driving in rotation and positioning the housings 81, 82.

A locking finger 106, 109 actuated by an electro-magnet 107, 110 cooperating with blind holes 108, 111 enables the locking of the angular position of the housings 81, 82 with respect to the motor 80.

Figure 13:
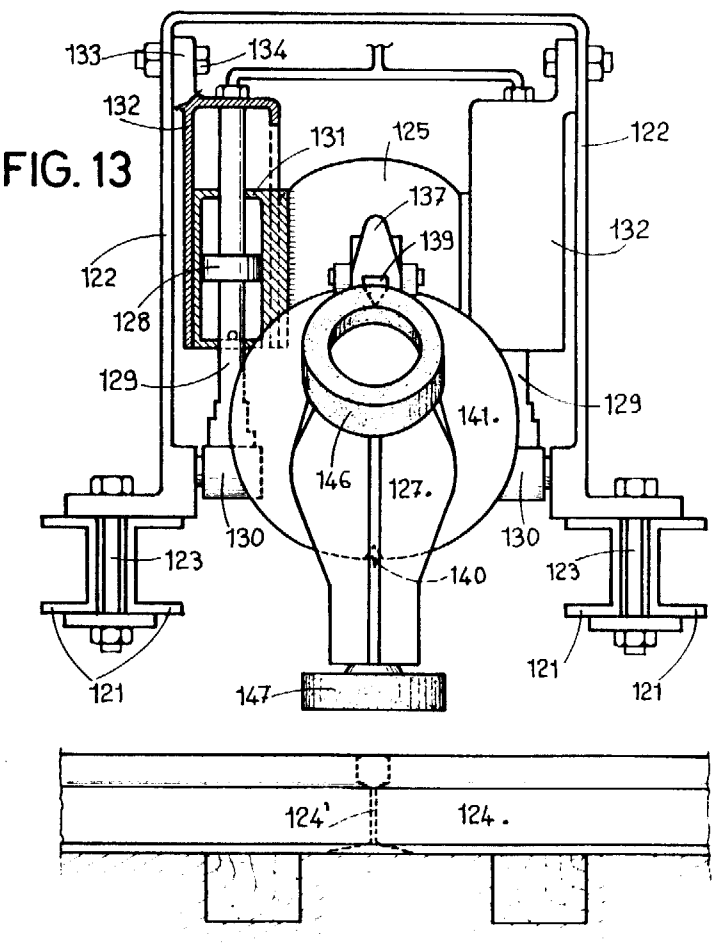
FIG. 13 is a view from D of the reprofiling device shown in FIG. 12.
Figure 12:
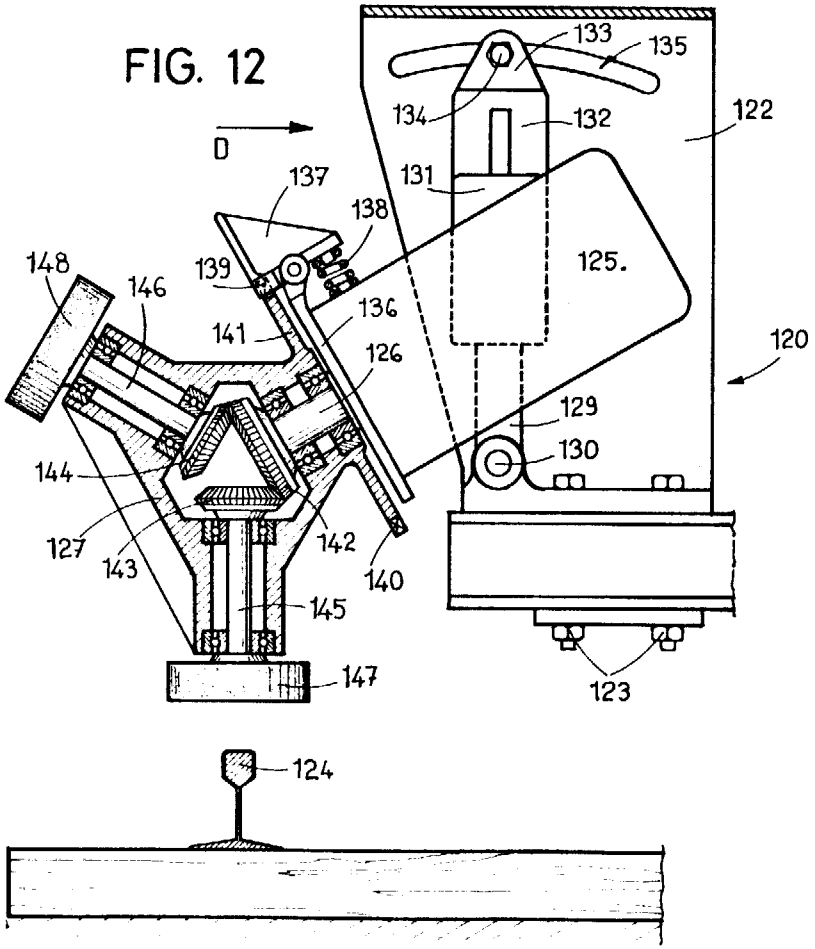
FIG. 12 is a partial crosssection of a fourth embodiment of the reprofiling device.

In the fourth embodiment of the reprofiling device (FIGS. 12 and 13) the reprofiling unit is mounted on a carriage 120 similar to the carriage 30 of the second embodiment, rolling along the track by means of flanged wheels and driven by a railroad vehicle. Means are also provided to permit displacements in height of this carriage with respect to the vehicle. These means are of very well-known types and will not be shown in this embodiment.

The frame of this carriage 120 comprises two transverse slides 121 formed by U shaped beams the dorsal portions of which are located one in front of the other. A yoke 122 is fixed by means of bolts 123 on these slides 121 in a position such that a tool of the reprofiling unit will be located, when it is in working position, above the rail 124.

The reprofiling unit comprises an electric motor 125 the driving shaft 126 which is rotatable in the wall of the housing 127 serving as support for a group of reprofiling tools.

This reprofiling unit is connected to a yoke 122 by a jack, the piston 128 of which is fast with a rod 129 hinged at flange 130 on the yoke and the cylinder 131 of which is fast with a housing of the motor 125. The cylinder 131 slides in a slotted sleeve 132 presenting a fixing lug 133 fastened by means of a bolt 134 to the upper part of the yoke 122. A slot 135 of arcuate shape permits modifying the inclination of the motor 125 and therefore of the grinding wheel with respect to the rail 124.

The frontal portion of the motor 125 which the motor shaft 126 emerges has a flange 136 carrying indexing ratchet 135, 137 subjected to the action of a spring 138 the finger 139 of which cooperates with notches 140 provided in the periphery of a disc 141 which is parallel to the flange 136 of the support or housing 127.

The end of the motor shaft 126 carries a driving pinion 142 meshing with two other pinions 143, 144 carried by driving shafts 145, 146 rotatable in the housing 127 forming between them and with the driving shaft angles of 120°. Each driving shaft 145, 146 carries at its free end emerging from the housing a rotative tool, here radial grinding wheels 147, 148.

In a position shown, the axis of the grinding wheel 147 in working position is located in a longitudinal, vertical plane of the rail 124 but thanks to the slot 135 the grinding wheel 147 may be inclined around the longitudinal axis of the rail to grind different side lines of the surface of the head of the rail.

In this embodiment when a grinding wheel 147 is in working position, the other grinding wheel 148 is in a waiting, inactive position which is simultaneously a position in which its replacement can be easily effected.

In this example, the axis of the motor 125 is disposed in a plane perpendicular to the longitudinal axis of the rail but in a variant it would be located in the vertical plane containing the longitudinal axis of the rail 124. In this variant the slides 121 would be longitudinal and the position of the rail would be that shown at 124'.

It is evident that the driving in rotation of the support 127 to place the grinding wheel 148 in working position, and to withdraw the grinding wheel 147 as well as the actuation of the indexing device 137, 138, 139 to lock the successive working positions of the housing can be motorised and controlled from the inside of the railroad vehicle driving the carriage 120.

Figure 14:
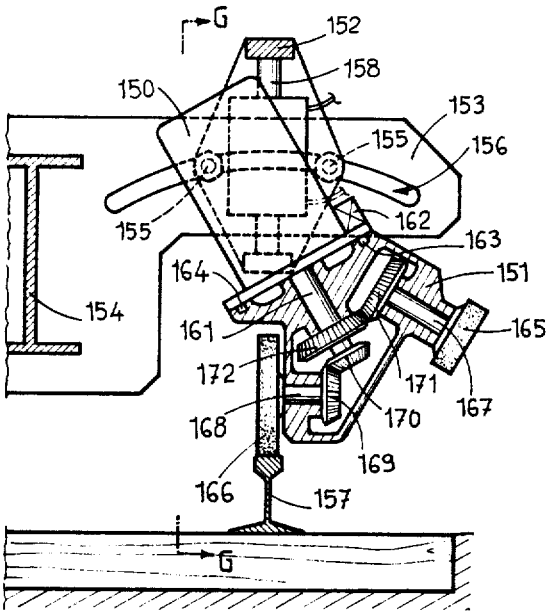
FIG. 14 is a partial crosssection of a fifth embodiment of the reprofiling device comprising a peripheral grinding wheel as well as a radial grinding wheel.
Figure 15:
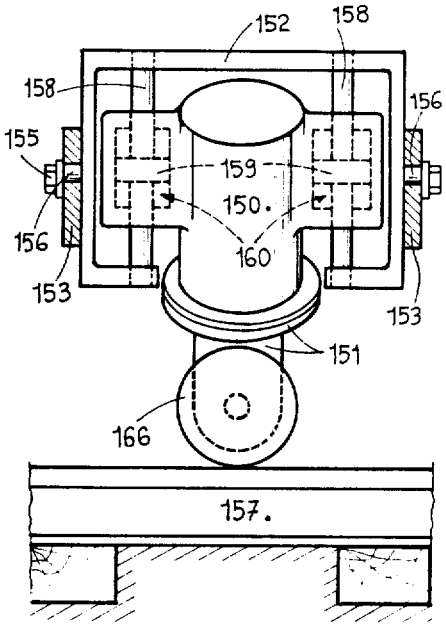
FIG. 15 is a crosssection along line G—G of FIG. 14.
Figure 18:
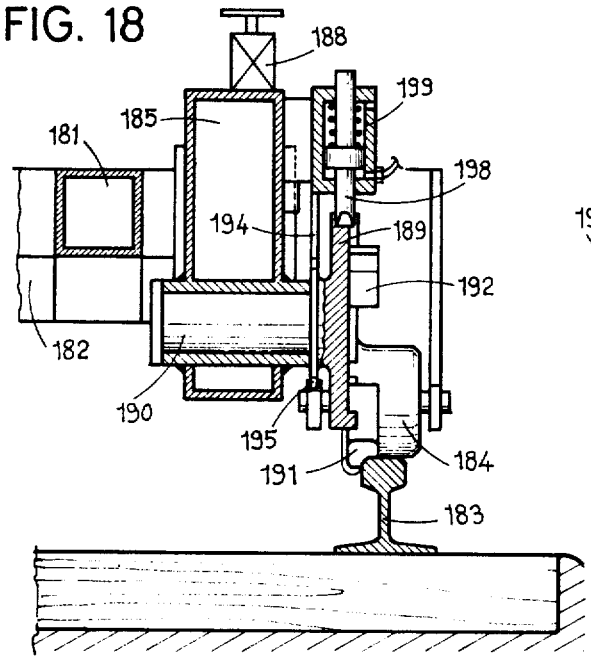
FIG. 18 is a crosssection along line E—E of FIG. 16.
Figure 19:
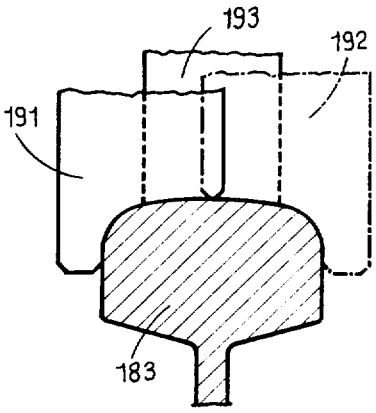
FIG. 19 is a view on a greater scale of a crosssection of the rail showing the service position of three cutters or scrapers with respect to this rail.
Figure 16:
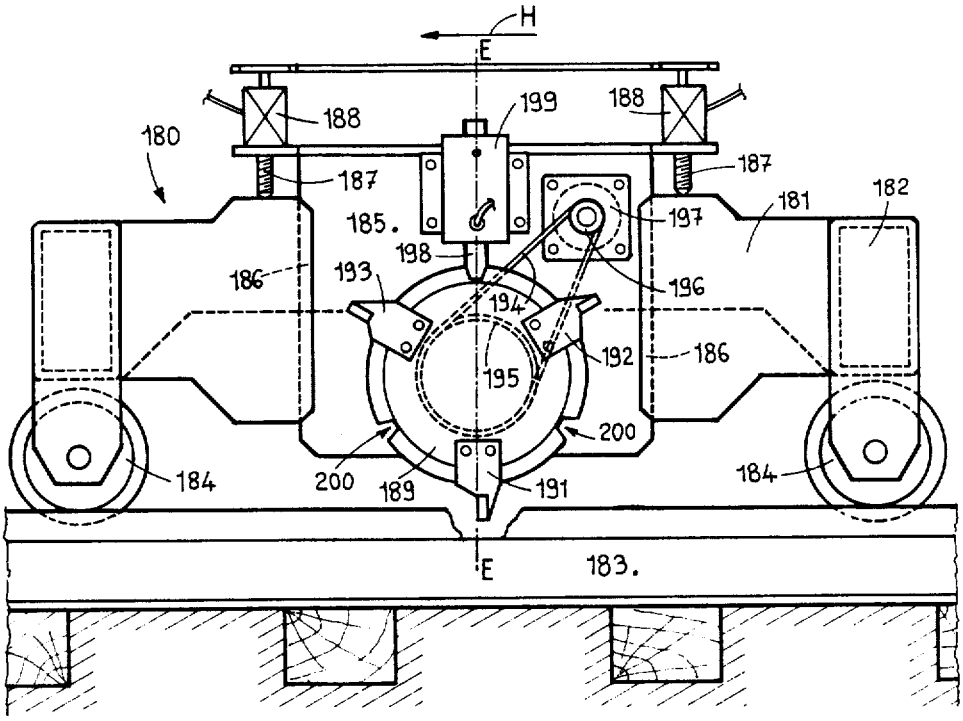
FIG. 16 is a side elevation of a sixth embodiment of the reprofiling device mounted on a carriage intended to be connected to a railroad vehicle, comprising tools constituted by cutters.
Figure 17:
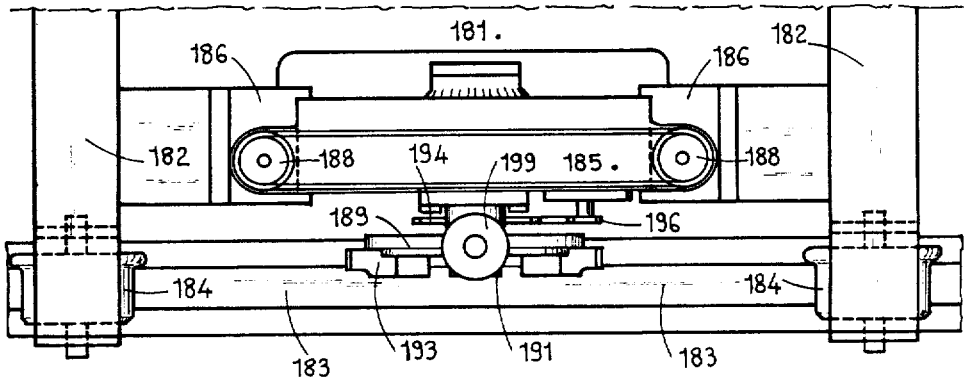
FIG. 17 is a partial top view of the device shown in FIG. 16.

In a fifth embodiment of the reprofiling device shown in FIGS. 14 and 15 the reprofiling unit comprises a motor 150 and a displaceable support 151 carrying a group of reprofiling tools on two plates 153 which are fast with a carriage 154 guided and driven along the track by a railroad vehicle.

The frame 152 is fixed by bolts 155 passing through a slot 156 of the plates 153 and can be inclined in order to modify the orientation of the tool which is in working position with respect to the rail 157.

The frame 152 comprises two columns 158 presenting each a piston 159 located in cylinders 160 forming part of the housing of the motor 150. Thanks to the pneumatic or hydraulic jacks thus constituted, one realizes means permitting to applying a tool against the rail with a determined force; these means permit also lifting the reprofiling unit to enable an angular positioning of the support 151.

Here also the support 151 can be angularly displaced around the shaft 161 of the motor 150. An electro-magnet 162, or a jack, actuating a lock 163 cooperating with blind holes 164 of the support 151 permits the locking in successive working positions of the housing 151.

In this embodiment, the group of tools comprises a radial grinding wheel 165 and a peripheral grinding wheel 166 mounted on shafts 167, 168 pivoted in the housing 151 and driven by the motor shaft 161 through the intermediary of gears 169, 170, 171 and 172.

In all the embodiments described up to now all the rotative tools carried by a support are preferably all simultaneously in rotation. The driven rotative tools which are in waiting position constitute then an important fly wheel permitting absorbing the abrupt load variations of the working tool.

The sixth embodiment of the reprofiling device shown in FIGS. 16 to 19 comprises a carriage 180 formed by a beam 181 and crossbeams 182 and rolling on the rails 183 of the track by flanged wheels 184. This carriage 180 is connected in a known manner as in the first embodiment described for example to a railroad vehicle by means ensuring its traction along the track and means permitting displacing it in height and if desired transversely with respect to the railroad vehicle.

This carriage 180 comprises for each line of rails a sliding block 185, slidably mounted in slides 186 fast with the carriage, which can displace substantially perpendicularly to the longitudinal axis of the rail. Adjustable abutments 187 motorised by electrical motor 188 adjust the height of the sliding block 185.

This sliding block 185 carries an angularly displaceable support formed by a plate 189 located in a vertical plane parallel to the longitudinal axis of the rail 183 comprising a shaft 190 rotatable about a horizontal axis in the sliding block 185.

This rotative support 189, 190 carries a group of reprofiling tools constituted by shaped cutters 191, 192 and 193 rigidly fixed to the periphery of the plate 189. The working face or cutting edge of these scrapers has a shape corresponding to a portion of the desired profile for the head of the rail. The cutters 191 and 192 are orientated in such a manner as to cooperate with the rail to reprofile it by scraping when the carriage is displaced in the direction of the arrow H whereas the cutter 193 is orientated to work on the rail when the carriage displaces in the reverse direction.

The setting in place of the working tools is effected by means of a positioning device of the support 189 comprising a chain 194 meshing with a toothed ring 195 fast with the shaft 190 and driven by a pinion 196 fast with a shaft of the motor 197 flanged to the support 185.

A lock 198 actuated by a jack 199 cooperates with notches 200 in the periphery of the plate 189 to fix its successive working positions.

In such an embodiment the cutting depth of the cutters 191, 192, 193 is determined by the motorised abutments 188 defining the position of the sliding block 185 and the bearing force of the cutters on the rail is given by the weight of this sliding block and of the members which it carries.

All these described embodiments using rotative or non rotative reprofiling tools, enable replacing rapidly and easily one working tool with a tool which is in waiting position to take account of its wear or to use a tool particularly adapted to a kind of desired work. Thus, the intervals between two trains can be used optimally for the reprofiling of the rail of the track.

Thanks to the reprofiling device according to the invention it is not necessary during the working on the track to skip the track switches or the level crossings, the grinding can continue, and all the track can be reprofiled.

I claim:

1. In a reprofiling device of the surface of the head of at least one rail of a railroad track comprising at least one reprofiling unit driven along the track by means of a railroad vehicle; means to displace in height the reprofiling unit with respect to the said railroad vehicle and means to apply at least one tool of the reprofiling unit against the rail; the improvement in which the reprofiling unit comprises at least one angularly displaceable support carried by said unit; there being a plurality of said reprofiling tools forming one group of tools mounted on this support in such a way that their faces or working edges are located in different planes; and means to position the support and to lock the support in any of a plurality of positions relative to said unit in each of which a different one of the said reprofiling tools of the group of tools is located in the same working position, cooperating with the rail, the other tools of the same group of tools being therefore in a waiting position, out of contact with the rail, at least one of said tools being a rotary tool, a motor for rotating said at least one rotary tool, a drive shaft extending from said motor, the support being pivotally mounted on said drive shaft for rotation between said plurality of positions, and means drivingly interconnecting said drive shaft and said at least one tool.

2. Device according to claim 1, characterized by the fact that each group of tools comprises at least two different types of tools.

3. Device according to claim 1, characterized by the fact that the tools of a same group of tools are all rotative tools.

4. Device according to claim 3, characterized by the fact that the tools of a same group of tools are all grinding wheels.

5. Device according to claim 4, characterized by the fact that each group of tools comprises grinding wheels of different diameters and of different hardnesses.

6. Device according to claim 4, characterized by the fact that each group of tools comprises at least one radial grinding wheel and at least one peripheral grinding wheel.

7. Device according to claim 1, characterized by the fact that each group of tools comprises at least one rotative tool and at least one fixed tool.

8. Device according to claim 3, characterized by the fact that all tools of a grinding unit are simultaneously driven in rotation.

9. Device according to claim 3, characterized by the fact that reduction ratios of driving linkages of the rotative tools of a same group are different.

10. Device according to claim 1, characterized by the fact that the unit comprises a frame mounted for rolling movement on flanged wheels along the rail to be reprofiled, the support being mounted for rotation on and relative to the frame.

11. Device according to claim 1, said drive shaft having a bevel gear thereon, and a bevel gear on said at least one rotary tool in mesh with said bevel gear on said drive shaft to drive said at least one rotary tool.

12. Device according to claim 11, said at least one rotary tool comprising a pair of rotary tools mounted for rotation in the support on a common shaft.

13. Device according to claim 11, said at least one rotary tool comprising two rotary tools on two different shafts, each of said two different shafts having a bevel gear thereon in mesh with said bevel gear on said drive shaft.

14. Device according to claim 11, there being four said rotary tools each having a bevel gear thereon in mesh with said bevel gear of said driving shaft.

*15. In a reprofiling device of the surface of the head of both rails of a railroad track comprising a pair of reprofiling units driven along the track by means of a railroad vehicle; means to displace in height the reprofiling units with respect to said railroad vehicle and means to apply at least one tool of each reprofiling unit against the rail; the improvement in which each reprofiling unit comprises at least one support carried by each said unit; a shaft extending through and beyond opposite ends of each said support and carrying at each of its ends a rotary grinding tool, means for rotating each shaft, means mounting said supports on their respective said units for rotation about axes perpendicular to and intersecting said shafts intermediate the ends of said shafts, an elongated beam disposed lengthwise in the direction of movement of the reprofiling device along the track, cross beams at the ends of said beam extending perpendicular to said beam on opposite sides of said beam, said means to displace in height the reprofiling unit including jacks at the ends of said cross beams by which said cross beams are interconnected to said railroad vehicle, and a rod intersecting said railroad vehicle with a point intermediate the length of said beam for pulling said units along the track, said units being disposed on opposite sides of said beam between a respective pair of said ends of said cross beams.*

*16. Device according to claim 15, said means to displace in height the reprofiling units including also further jacks disposed between the ends of said cross beams and said supports.*

* * * * *